T. H. FEWLASS.
PNEUMATIC OR AIR VALVE FOR INFLATING VARIOUS BODIES.
APPLICATION FILED JULY 26, 1919.
1,326,445. Patented Dec. 30, 1919.
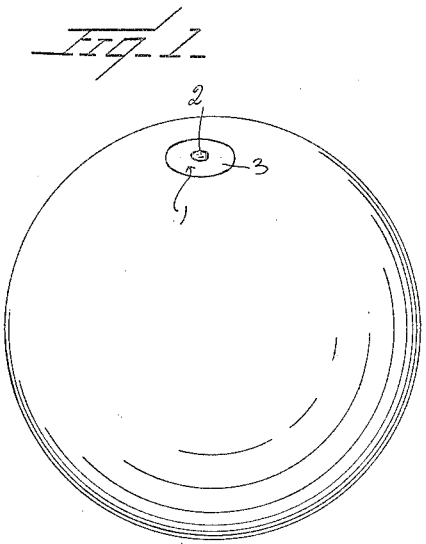
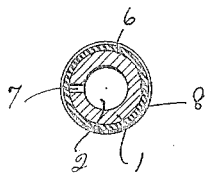
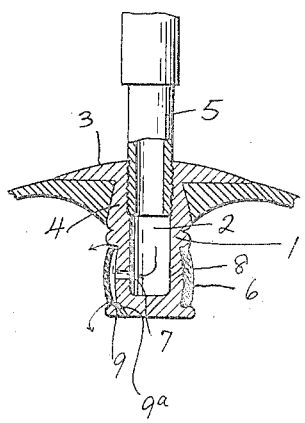
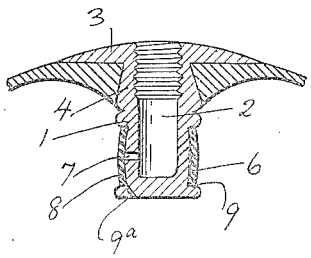
Inventor
T. H. Fewlass
By Watson E. Coleman
Attorney

UNITED STATES PATENT OFFICE.

THOMAS H. FEWLASS, OF DETROIT, MICHIGAN.

PNEUMATIC OR AIR VALVE FOR INFLATING VARIOUS BODIES.

1,326,445.     Specification of Letters Patent.     Patented Dec. 30, 1919.

Application filed July 26, 1919. Serial No. 313,578.

*To all whom it may concern:*

Be it known that I, THOMAS H. FEWLASS, a citizen of the United States, residing at Highland Park, Detroit, in the county of Wayne and State of Michigan, have invented certain new and useful Improvements in Pneumatic or Air Valves for Inflating Various Bodies, of which the following is a specification, reference being had to the accompanying drawings.

This invention relates to an improved pneumatic or air valve for inflating various bodies, such as the inner tubes of tires, balls, balloons and other pneumatic appliances, and an object of the invention is to provide an inflating valve which is simple, efficient, practical in construction, and may be manufactured for a relatively low cost and sold at a reasonable profit. A further object of the invention is to provide an improved inflating valve for such pneumatic bodies, comprising a valve stem and a circular head, the stem protruding into the body to be pneumatically inflated, in combination with an annular rubber sleeve or band adapted to overlie and hug a perforated portion of the stem, serving to prevent escape of the air or gas within the body, which is inflated.

A further object of the invention is to provide a hollow valve stem having an annular groove, there being a perforation in the bottom of the groove, whereby an elastic band or sleeve (which is received in the annular groove) may overlie the aperture or perforation to prevent the escape of the gas or air that is contained in the body. It is obvious that when the stem of an air pump is inserted into the hollow valve stem and connected thereto by threads, air is forced into the stem, whereby the pressure is sufficient to lift the band or sleeve, allowing the air to enter the body to be inflated. However, as soon as the pressure of air created by the pump ceases, the band or sleeve owing to its elasticity reseats itself over the perforation, and prevents the escape of the air.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed:

In the drawings:

Figure 1 is a view of an inflatable body, showing the valve applied thereto.

Fig. 2 is an enlarged sectional view through a portion of the wall of the body showing the inflating valve in position and the elastic band or sleeve partly raised which is due to the pressure of air, and also showing the stem of the pneumatic pump threaded into the valve.

Fig. 3 is an enlarged sectional view similar to Fig. 2, but eliminating the stem of the pneumatic pump, and also illustrating the sleeve or band closed.

Fig. 4 is a cross-sectional view through the hollow valve adjacent the groove thereof, showing the band or sleeve in section.

Referring more especially to the drawings, 1 designates a hollow valve body, having a bore 2, and is provided at one end with a circular disk 3. The hollow valve body is provided with a neck portion 4, which is engaged by the marginal edge of the opening of the inflatable body, so as to retain the valve body in place. In fact, in using the device in connection with certain bodies to be inflated, the marginal edge of the opening of the body to be inflated may be cemented, vulcanized or otherwise connected to the valve body, in order to assure prevention of the escape of air.

The hollow valve body has its bore near the outer face of the circular disk interiorly threaded, to be engaged by the threads of the stem 5 of a pneumatic pump. The pneumatic valve body is provided with an annular groove 6, and formed in the bottom of the groove through the wall of the valve body is a perforation or aperture 7. Engaging the groove and hugging the bottom thereof is an elastic band or sleeve 8, which overlies the perforation or aperture. This sleeve or band, owing to its elasticity may expand under the pressure of air being injected into the valve body, and when the pressure is relieved, the band will automatically reseat itself over the perforation, thereby preventing the escape of air. The shoulders 9 adjoining the groove, act to prevent upward or downward movement of the sleeve or band, thereby holding the band in position, so as to cover the perforation or aperture at all times.

The lower portion of the valve body 1 adjacent the lower shoulder 9 is provided with an opening 9ª to allow the escape of air to the bladder more easily where the rubber band is raised.

The invention having been set forth, what is claimed as new and useful is:

1. The combination with a body to be inflated having an opening, of a valve body provided with an elongated bore, the inner end being closed, its outer end open, said body having an annular groove, the bottom of which has a perforation, and an elastic sleeve surrounding the valve body and seated in said groove and adapted to overlie the perforation, to prevent the escape of air.

2. The combination with a body to be inflated, having an opening, of a valve body having a neck engaging said opening, one end of the body having a circular disk engaging the outer surface of the body to be inflated, the valve body having a bore, being closed at one end and open at the other adjacent the disk and being interiorly threaded, the valve body being provided with an annular groove, the bottom of the groove having a perforation communicating with the bore, and an elastic sleeve engaging said groove and intermediate the end walls of the groove, and adapted to elastically cover the perforation to prevent the escape of air.

3. A valve body for inflating bodies, said valve body having an annular groove at its lower portion positioned within the body to be inflated, said valve body being hollow and provided with an opening in its wall adjacent the bottom of the groove to permit air to enter the hollow of the body and pass out through the opening into the body to be inflated, an elastic band seated in said groove to cover the opening in the bottom of the groove, the opposite ends of the groove having shoulders, one of the shoulders having an opening to permit of the escape of air into the body to be inflated when the elastic band is raised.

In testimony whereof I hereunto affix my signature in the presence of two witnesses.

THOMAS H. FEWLASS.

Witnesses:
W. L. LORANGER,
MICHAEL J. O'REILLY.